United States Patent
Eng et al.

(10) Patent No.: US 8,213,545 B2
(45) Date of Patent: Jul. 3, 2012

(54) RADIO RECEIVING APPARATUS AND RADIO RECEIVING METHOD

(75) Inventors: Yew Soo Eng, Singapore (SG); Zhan Yu, Singapore (SG); Suguru Fujita, Tokyo (JP)

(73) Assignee: Panasonic Corporation, Osaka (JP)

( * ) Notice: Subject to any disclaimer, the term of this patent is extended or adjusted under 35 U.S.C. 154(b) by 309 days.

(21) Appl. No.: 12/162,722

(22) PCT Filed: Jan. 25, 2007
(Under 37 CFR 1.47)

(86) PCT No.: PCT/JP2007/051193
§ 371 (c)(1),
(2), (4) Date: Jun. 18, 2009

(87) PCT Pub. No.: WO2007/088773
PCT Pub. Date: Aug. 9, 2007

(65) Prior Publication Data
US 2010/0208846 A1 Aug. 19, 2010

(30) Foreign Application Priority Data
Jan. 31, 2006 (JP) .............................. 2006-023586
Jan. 24, 2007 (JP) .............................. 2007-014314

(51) Int. Cl.
H04L 7/00 (2006.01)
H04L 27/06 (2006.01)
(52) U.S. Cl. ........ 375/320; 375/340; 375/343; 375/354; 375/130; 375/260
(58) Field of Classification Search .................. 375/316, 375/354, 138, 142, 158, 268; 714/400, 789, 714/707; 332/145
See application file for complete search history.

(56) References Cited

U.S. PATENT DOCUMENTS

| | | | |
|---|---|---|---|
| 5,375,141 A * | 12/1994 | Takahashi | 375/149 |
| 5,590,160 A | 12/1996 | Ostman | |
| 5,768,306 A | 6/1998 | Sawahashi | |
| 6,636,573 B2 * | 10/2003 | Richards et al. | 375/355 |
| 6,917,228 B2 | 7/2005 | Cooper | |
| 6,925,108 B1 | 8/2005 | Miller | |
| 6,967,993 B1 * | 11/2005 | Miller | 375/150 |

(Continued)

FOREIGN PATENT DOCUMENTS

JP 8-237170 9/1996

(Continued)

OTHER PUBLICATIONS

Japanese Office Action dated Apr. 27, 2010.

(Continued)

*Primary Examiner* — David Ometz
*Assistant Examiner* — Ross Varndell
(74) *Attorney, Agent, or Firm* — Dickinson Wright PLLC

(57) ABSTRACT

A radio receiving apparatus and method of using thereof, in which the radio receiving apparatus includes a first synchronization circuit, a second synchronization circuit, and a demodulation section that demodulates an incoming signal based on one of synchronization information output from the first synchronization circuit and synchronization information output from the second synchronization circuit, the first synchronization circuit including a first correlation section that determines a correlation between the incoming signal and a first pulse template received as input at a timing corresponding to a first reference signal, the second synchronization circuit including a second correlation section that determines a correlation between the incoming signal and a second pulse template received as input at a timing corresponding to a second reference signal, and the first pulse template having a longer width than a width of the second pulse template.

22 Claims, 13 Drawing Sheets

U.S. PATENT DOCUMENTS 7,248,659 B2 * 7/2007 Roberts .......................... 375/355

FOREIGN PATENT DOCUMENTS

| JP | 2002-524968 | 8/2002 |
| JP | 2006-311500 | 11/2006 |
| WO | 95/07577 | 3/1995 |
| WO | 2006/121012 | 11/2006 |

OTHER PUBLICATIONS

International Search Report dated Feb. 27, 2007.

Jihad Ibrahim et.al, "Two-stage acquisition for UWB in dense multipath," Military Communications Conference,2005, MILCOM 2005, IEEE, Oct. 2005.

* cited by examiner

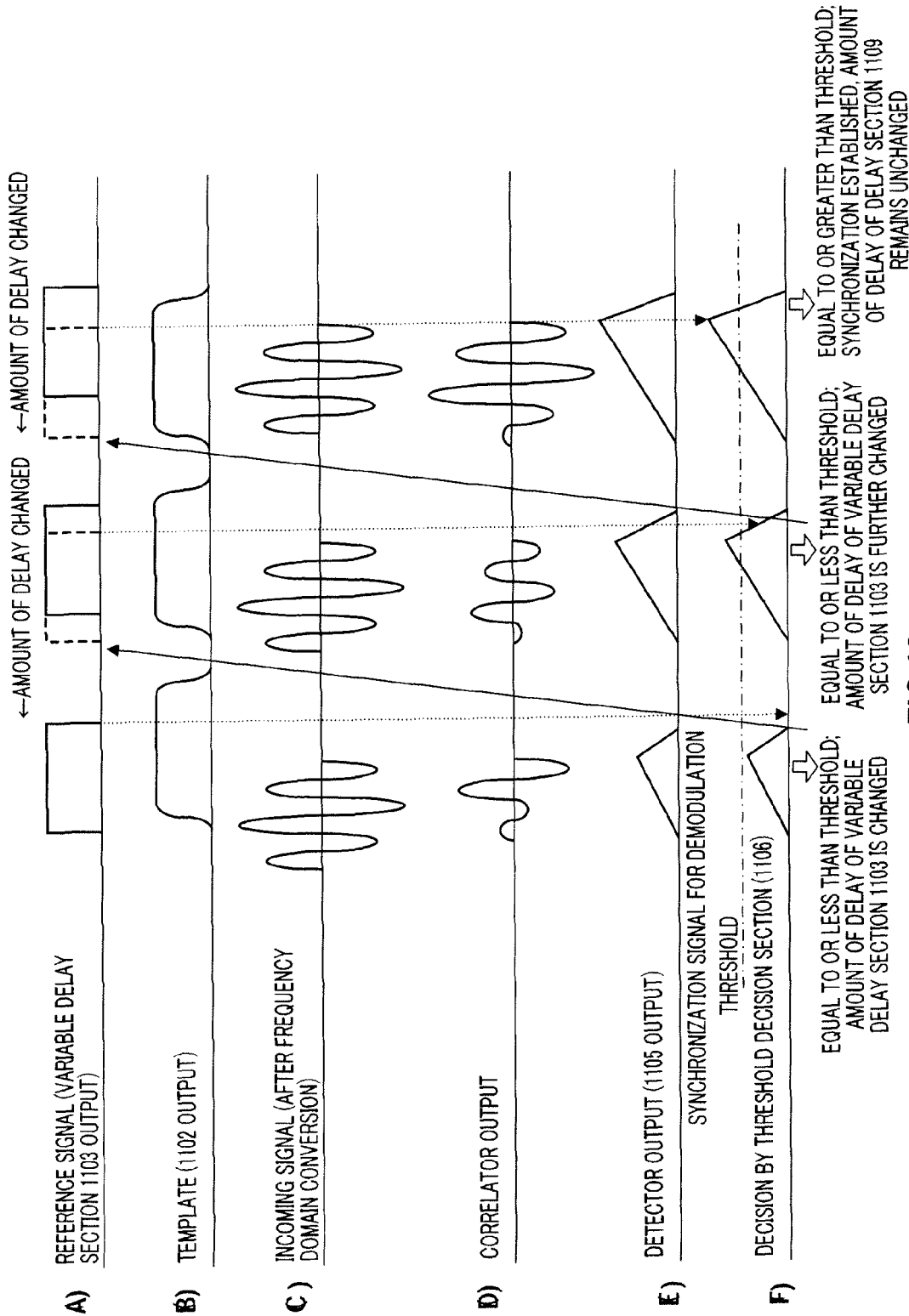

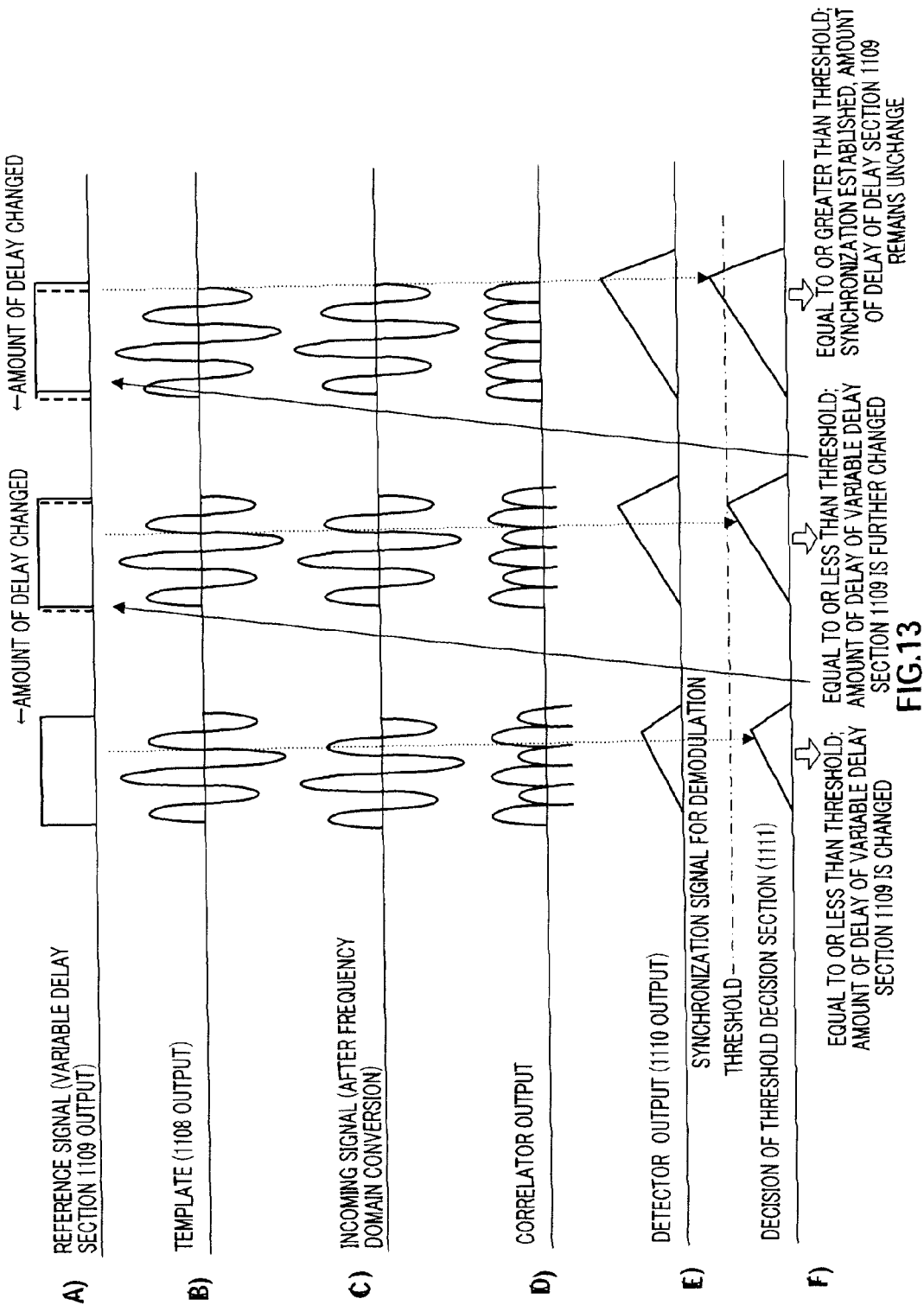

RADIO RECEIVING APPARATUS AND RADIO RECEIVING METHOD

TECHNICAL FIELD

The present invention relates to a radio receiving apparatus and a radio receiving method.

BACKGROUND ART

Recent advances in communications technology have enabled the use of transmitting and receiving a sequence of very short-duration radio frequency (RF) pulses, the duration of which is typically less than a nanosecond. This is often referred to as impulse radio (IR). IR communication realizes faster data communication by transmitting pulsed signals using a wide frequency band.

In an IR communication system, the transmitting side superimposes data on a propagation signal to transmit the data to the receiving side at a distant location and the receiving side extracts the data from the incoming signal, and a communication is thereby realized. In order to accurately extract the data from the incoming signal, the receiving side clock should be synchronized with the transmitting side clock, but the transmitter clock and the receiving side clock are usually not synchronized.

Therefore, when the receiving side extracts desired data, the receiving side needs to establish synchronization with the transmitting side first. Moreover, the faster the receiving side is synchronized with the incoming signal, the faster the receiver can achieve an acceptable communication quality. As a result, a merit of improving average throughput in the system is obtained. Therefore, establishment of fast synchronization is desirable.

Many radio communication systems have some type of synchronization referred to as a "clock recovery" incorporated into the receiver. The synchronization, in general, is achieved by extracting a suitable control signal from the incoming signal, and using a PLL (phase locked loop) to keep the error between the extracted control signal and a locally generated copy of the control signal as small as possible.

One such technique is based on Delay-Locked-Loop (DLL) where the combined impulse response of the transmitting side filter, communication channel and receiver filter is computed in the receiver based on the incoming signal. DLL then tries to minimize the difference between the delay of the channel and the reference delay of the locally generated impulse response.

One known DLL tracking method is called an "Early-Late DLL" method. According to this method, one sample of the impulse response is calculated half of the chip earlier and another sample is calculated one half of a chip later than the desired sampling point.

Furthermore, another method is disclosed in Patent Document 1. According to this method, one sample of the impulse response is calculated half of a chip earlier than the desired sampling point and another sample is calculated at the desired sampling point. DLL is then using those sample values in phase locked loop to control the synchronization timing. Patent Document 1 discloses a DLL operation. More specifically, the ratio of those samples is compared to a reference ratio, and the result is used as an error signal for phase locked loop.

Patent Document 1: U.S. Pat. No. 5,590,160

DISCLOSURE OF INVENTION

Problems to be Solved by the Invention

One problem with any time modulated IR transmission scheme is the difficulty of establishing time synchronization. Especially when the transmission signal consists of bursts, the receiver has no prior information whatsoever about timing of the transmitting side, and it is therefore difficult to establish time synchronization. That is, when a signal is transmitted in bursts, the receiver does not know beforehand when to receive the signal, and it is therefore necessary to detect the presence of the incoming signal itself. It is further difficult to establish time synchronization when the transmission signal consists of bursts of narrow pulses which are in nanoseconds.

Furthermore, a conventional typical DLL uses a delay line to delay the external signal. Inmost cases, the external and internal signals are initially not synchronized, but the DLL performs a synchronization process to synchronize the external and internal signals. More specifically, in the synchronization process, the DLL compares the external and internal signals to detect for a time delay between them. After the comparison, the DLL adjusts the delay of the delay line by a preset amount of delay to correct the detected time delay. After the adjustment, the DLL compares the external and internal signals again and then adjusts the delay with the preset amount when the time delay between both signals is detected. This processing corrects any subsequent time delay.

Thus, conventional typical DLL repeats the comparison and adjustment many times to synchronize the external and internal signals, and thereby wastes time and power until synchronization is established. This requirement means that the initial synchronization is very computationally demanding in the receiver mounted with the conventional DLL, and this computational burden can result in a very long acquisition time, resulting in a problem that power consumption increases. Furthermore, the presence of multipath signals causes synchronization with locally optimal timing, resulting in a problem that the original synchronization point is not reached.

It is therefore an object of the present invention to provide a radio receiving apparatus and a radio receiving method capable of realizing establishment of fast and highly reliable synchronization.

Means for Solving the Problem

The radio receiving apparatus of the present invention employs a configuration having a first synchronization circuit that synchronizes an incoming signal with a first reference signal, a second synchronization circuit that synchronizes the incoming signal with a second reference signal based on the first reference signal when synchronization is established in the first synchronization circuit, and a demodulation section that demodulates the incoming signal based on at least one of synchronization information about the first synchronization circuit and synchronization information about the second synchronization circuit.

The radio receiving method of the present invention includes a first synchronization establishment step of synchronizing an incoming signal with a first reference signal, a second synchronization establishment step of synchronizing the incoming signal with a second reference signal based on the first reference signal when synchronization is established in the first synchronization establishment step and a step of demodulating the incoming signal based on at least one of synchronization information about the first synchronization establishment step and synchronization information about the second synchronization establishment step.

Advantageous Effect of the Invention

The present invention can provide a radio receiving apparatus and a radio receiving method capable of realizing establishment of fast and highly reliable synchronization.

BRIEF DESCRIPTION OF DRAWINGS

FIG. 12 illustrates synchronization processing in the first synchronization circuit of the synchronization establishment unit in FIG. 10; and FIG. 13 illustrates the synchronization processing in the second synchronization circuit of the synchronization establishment unit in FIG. 10.

BEST MODE FOR CARRYING OUT THE INVENTION

Figure 1:
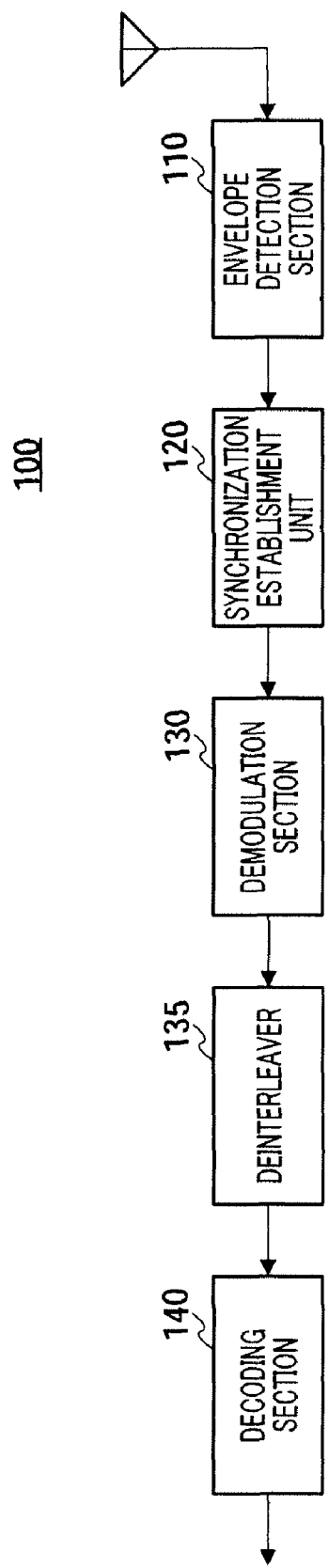
FIG. 1 is a block diagram showing a main configuration of an impulse radio (IR) receiver according to Embodiment 1 of the present invention.

Embodiments of the present invention will be explained below in detail with reference to the accompanying drawings. In the Embodiments, the same components will be assigned the same reference numerals and repeated explanations thereof will be omitted.

Embodiment 1

FIG. 1 shows a block diagram showing a main configuration of impulse radio (IR) receiver 100 according to Embodiment 1. IR receiver 100 receives a pulse signal transmitted from the IR transmitter (not shown) of the transmitting side. As shown in the figure, IR receiver 100 is provided with envelope detection section 110, synchronization establishment unit 120, demodulation section 130, deinterleaver 135 and decoding section 140.

Envelope detection section 110 applies envelope detection to the incoming signal transmitted from an IR transmitter (not shown) of the transmitting side and received through an antenna, and outputs the envelope result (envelope) to synchronization establishment unit 120. Envelope detection section 110 performs, for example, square operation and integration operation, and outputs the result thereof as an envelope result.

Synchronization establishment unit 120 synchronizes the incoming pulse signal with the internal clock signal. More specifically, synchronization establishment unit 120 establishes synchronization of coarse accuracy in time, based on the first correlation result between the envelope result from envelope detection section 110 and the first pulse template. Moreover, at the stage coarse synchronization is established, synchronization establishment unit 120 establishes fine synchronization based on a second correlation result between the first correlation result and a second pulse template. At the stage fine synchronization is established, synchronization establishment unit 120 outputs a report signal indicating that synchronization has been established, to demodulation section 130. Here, the first pulse template and second pulse template are both pulse signals, but the width of the first pulse template (that is, the period after the pulse has risen) is longer than that of the second pulse template. Furthermore, "coarse synchronization processing" refers to the processing of deciding whether or not an incoming pulse signal exists in the period using the first pulse template having a long width (corresponding to the first pulse detection window, which will be described later). IR receiver 100 can increase the probability of detecting the incoming pulse signal by using the first pulse template having a long pulse width, even when the timing at which the incoming pulse signal arrives is not known.

On the other hand, "fine synchronization processing" refers to the processing of, using a second pulse template having a short width (corresponding to a second pulse detection window, which will be described later), deciding whether or not the incoming pulse signal exists in the period or whether or not the incoming pulse signal just fits in the period. Pulses used in IR communication have a very short width and need to synchronized accurately. The use of a second pulse template having a short pulse width allows accurate synchronization with the incoming pulse signal. Details of synchronization establishment unit 120 will be described later.

Upon receiving the report signal, demodulation section 130 demodulates the incoming signal from synchronization establishment unit 120. More specifically, while establishing synchronization using the amount of delay (amount of delay outputted from variable delay section 165 when synchronization is established) received from synchronization establishment unit 120 when synchronization is established, demodulation section 130 compares the second correlation result likewise received from synchronization establishment unit 120 with a value to be compared stored therein, and converts the comparison result to bits. This demodulation scheme corresponds to the modulation scheme in the IR transmitting side of the transmitting side and examples of the modulation scheme include PPM (Pulse Phase Modulation) and PAM (Pulse Amplitude Modulation).

Deinterleaver 135 de-interleaves the bit sequence from demodulation section 130 and outputs the de-interleaved bit sequence to decoding section 140.

Decoding section 140 applies error correcting decoding processing to the bit sequence from deinterleaver 135 and outputs received data. Here, when the IR transmitter of the transmitting side performs convolutional coding or FEC coding, decoding section 140 performs Viterbi decoding.

Figure 2:
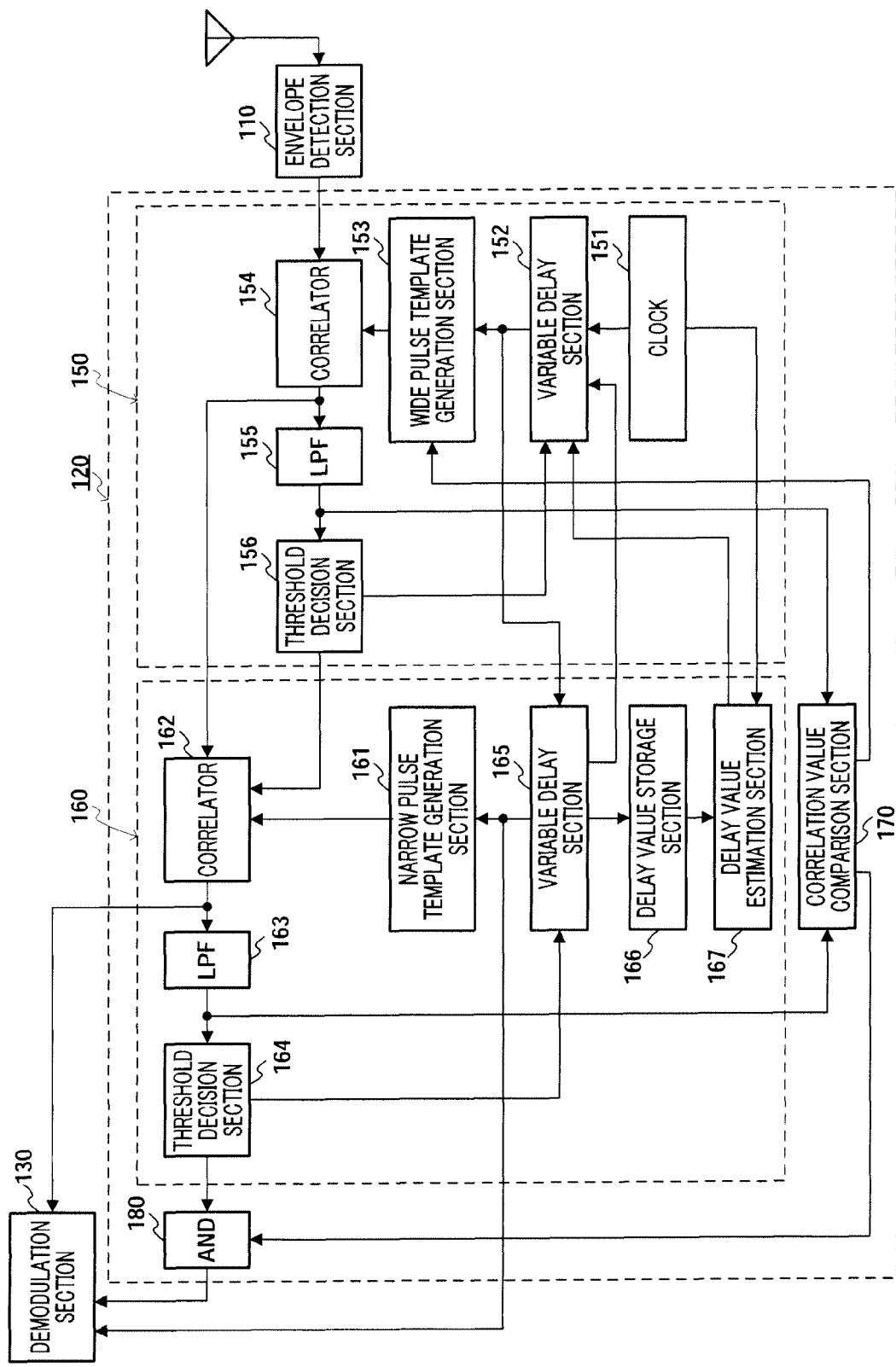
FIG. 2 is a block diagram mainly showing a configuration of the synchronization establishment unit in FIG. 1.

As shown in FIG. 2, synchronization establishment unit 120 has DLL module 150 that performs coarse synchronization processing, DLL module 160 that performs fine synchronization processing, correlation value comparison section 170 and AND circuit 180. This DLL module 150 has clock 151, variable delay section 152, wide pulse template generation section 153, correlator 154, low pass filter (LPF) 155 and threshold decision section 156. On the other hand, DLL module 160 has narrow path template generation section 161, correlator 162, LPF 163, threshold decision section 164, variable delay section 165, delay value storage section 166 and delay value estimation section 167.

Clock 151 generates an internal clock signal in IR receiver 100 and outputs the internal clock signal to variable delay section 152 and DLL module 160.

Variable delay section 152 gives a predetermined delay to an input signal and outputs the signal. The amount of delay is variable. Variable delay section 152 gives a delay to the internal clock signal and outputs the internal clock signal to wide pulse template generation section 153 and DLL module 160. Furthermore, variable delay section 152 receives as input a control signal from threshold decision section 156, the amount of delay at variable delay section 165 and an estimated amount of delay from delay value estimation section 167 and changes the amount of delay based on these inputs.

Wide pulse template generation section 153 generates the first pulse template of a predetermined period (hereinafter also referred to as the "first pulse detection window"). Wide pulse template generation section 153 outputs the first pulse template according to the timing the internal clock signal is received from variable delay section 152. That is, wide pulse template generation section 153 outputs a pulse template having a time length matching the first pulse detection window every time the internal clock signal is received.

Correlator 154 multiplies the envelope result from envelope detection section 110 by the first pulse template and outputs the multiplication result to DLL module 160 and LPF 155.

LPF 155 integrates the multiplication result from correlator 154 over a predetermined period (e.g., frame period, first pulse detection window, etc.) and outputs the integration result to threshold decision section 156 and correlation value comparison section 170.

Threshold decision section 156 outputs a control signal corresponding to the level of the integration result from LPF 155. More specifically, threshold decision section 156 compares the amplitude of the input signal, which is the integration result from LPF 155, with a predetermined threshold. When the amplitude of the input signal is less than the predetermined threshold, threshold decision section 156 decides that coarse synchronization has not been achieved yet, and outputs a control signal for changing the amount of delay to variable delay section 152. On the other hand, when the amplitude of the input signal is equal to or greater than the threshold, threshold decision section 156 decides that coarse synchronization has been achieved and outputs a control signal for reporting that decision, to correlator 162 of DLL module 160. This control signal causes DLL module 160 to be activated.

Narrow path template generation section 161 of DLL module 160 generates a second pulse template of a predetermined period (hereinafter also referred to as a "second pulse detection window"), and outputs this second pulse template at the timing at which the internal clock signal is received from variable delay section 165. That is, wide pulse template generation section 153 outputs a pulse template of a time length matching the second pulse detection window every time the internal clock signal is received. The internal clock signal received by narrow pulse template generation section 161 has been delayed by a predetermined amount at variable delay section 152 and further delayed by a predetermined amount at variable delay section 165.

Upon receiving the control signal from threshold decision section 156, correlator 162 multiplies the multiplication result at correlator 154 by the second pulse template and outputs the multiplication result to demodulation section 130 and LPF 163.

LPF 163 integrates the multiplication result from correlator 162 over a predetermined period (e.g., frame period, second pulse detection window, etc.) and outputs the integration result to threshold decision section 164 and correlation value comparison section 170.

Threshold decision section 164 outputs a control signal corresponding to the level of the integration result (correlation value) from LPF 163. More specifically, threshold decision section 164 compares the amplitude of the input signal, which is the integration result (correlation value) from LPF 163, with a predetermined threshold. When the amplitude of the input signal is less than the predetermined threshold, threshold decision section 164 decides that fine synchronization has not been achieved yet, and outputs a control signal for changing the amount of delay to variable delay section 165. On the other hand, when the amplitude of the input signal is equal to or greater than the threshold, threshold decision section 164 decides that fine synchronization has been achieved and outputs a control signal for reporting that, to AND circuit 180.

Variable delay section 165 gives a predetermined delay to the input signal and outputs the signal. The amount of delay thereof is variable and variable delay section 165 gives a delay to the internal clock signal from variable delay section 152 and outputs the internal clock signal to narrow pulse template generation section 161. Furthermore, variable delay section 165 receives as input the control signal from threshold decision section 164 and changes the amount of delay based on this control signal. Variable delay section 165 then outputs the changed amount of delay to variable delay section 152 as feedback, and also outputs the changed amount of delay to delay value storage section 166.

Delay value storage section 166 stores the changed amount of delay outputted every time variable delay section 165 changes the amount of delay, and outputs the changed amount of delay to delay value estimation section 167.

Delay value estimation section 167 receives the last changed amount of delay, compares this amount of delay with the clock signal from clock 151 and estimates the delay value. This estimated delay value is outputted to variable delay section 152.

Correlation value comparison section 170 receives as input the integration result (correlation value) related to the multiplication result in correlator 154 and the integration result (correlation value) related to the multiplication result in correlator 162, for a predetermine period, and compares the amplitudes of both input signals. When the amplitudes of both input signals are equal, correlation value comparison section 170 decides that synchronization has been established and outputs a control signal to AND circuit 180.

On the other hand, when the integration result (correlation value) related to the multiplication result in correlator 154 is greater than the integration result (correlation value) related to the multiplication result in correlator 162, correlation value comparison section 170 decides that synchronization has not been established yet, and outputs window width control information for controlling the pulse detection window width, to wide pulse template generation section 153. That is, when the integration result (correlation value) related to the multiplication result in correlator 154 is greater than the integration result (correlation value) related to the multiplication result in correlator 162, there may be multipath signals in the first pulse detection window. For this reason, to prevent multipath signals arriving late from being detected in the first pulse detection window, correlation value comparison section 170 outputs window width control information to narrow the window width of the first pulse detection window.

When the window width control information is outputted in this way, DLL module 150 performs coarse synchronization processing in the changed window width. When the integration result (correlation value) related to the multiplication result in correlator 154 repeats being decided to be greater than the integration result (correlation value) related to the multiplication result in correlator 162, the window width of the first pulse detection window becomes closer to the second detection window width and eventually becomes the same width (on the order of several tens of picoseconds to several hundreds of picoseconds).

When both control signals; the control signal from threshold decision section 164 and the control signal from correlation value comparison section 170 have been inputted, AND circuit 180 outputs a control signal to demodulation section 130. That is, AND circuit 180 outputs a control signal to demodulation section 130 when synchronization is completed.

Next, the operation of synchronization establishment unit 120 in the above configuration will be explained.

First, correlator 154 of DLL module 150 finds the correlation between the envelope result and the first pulse template.

Threshold decision section 156 compares the integration result (correlation value) resulting from integration of multiplication results obtained in correlator 154 over a predetermined period with a predetermined threshold and decides whether or not coarse synchronization has been established.

When it is decided that coarse synchronization has not been established yet (when integration result (correlation value) is less than the threshold), threshold decision section 156 outputs a control signal to variable delay section 152, and variable delay section 152 adjusts the amount of delay to give to the clock signal. By adjusting the amount of delay, the output timing of the first pulse template shifts from the timing before adjustment, and therefore correlator 154 can carry out multiplication by shifting the timing at which the envelope result is multiplied by the first pulse template (relative positional relationship).

On the other hand, when it is decided that coarse synchronization has been established (when integration result (correlation value) is equal to or greater than the threshold), threshold decision section 156 outputs a control signal for reporting that decision, to correlator 162 of DLL module 160. This control signal causes DLL module 160 to be activated.

Upon receiving a control signal indicating that coarse synchronization has been established, correlator 162 of DLL module 160 determines the correlation between the correlation result of correlator 154 and the second pulse template. Since a clock signal whose delay has been adjusted by variable delay section 152 is inputted to narrow pulse template generation section 161 through variable delay section 165, the timing (relative positional relationship) for determining the correlation between the correlation result of correlator 154 and the second pulse template matches the correlation timing DLL module 150 decides that coarse synchronization has been established.

Threshold decision section 164 compares the integration result (correlation value) resulting from integration of multiplication results obtained at correlator 162 over a predetermined period with a predetermined threshold, and decides whether or not fine synchronization has been established.

Upon deciding that fine synchronization has not been established (when the integration result (correlation value) is less than the threshold), threshold decision section 164 outputs a control signal to variable delay section 165, and variable delay section 165 adjusts the amount of delay to give to the clock signal. By adjusting the amount of delay, the output timing of the second pulse template shifts, and therefore correlator 162 can multiply the multiplication result obtained at correlator 154 by the second pulse template at the shifted timing (relative positional relationship).

Upon deciding that fine synchronization has been established (integration result (correlation value) is equal to or greater than the threshold), threshold decision section 164 outputs a control signal to AND circuit 180.

Here, the processing may also be shifted to demodulation section 130 at the stage threshold decision section 164 decides that fine synchronization has been established. That is, AND circuit 180 may not be provided. However, there may be influence of multipath signals and carrying out subsequent processing such as demodulation processing under the influence of multipath signals may lead to deterioration of communication quality. Therefore, processing to alleviate the influence of multipath signals will be carried out.

That is, correlation value comparison section 170 compares the result of integration (correlation value) of correlations at correlator 154 of DLL module 150 with the result of integration (correlation value) of the correlations at correlator 162 of DLL module 160, and does not decide that synchronization is complete until both integration results (correlation values) match. It is not until correlation value comparison section 170 decides that synchronization is complete that subsequent processing such as demodulation processing is carried out. More specifically, upon deciding that synchronization is complete, correlation value comparison section 170 outputs a control signal to AND circuit 180. AND circuit 180 does not send out a report signal indicating that synchronization is complete, to demodulation section 130 until both control signals; the control signal from this correlation value comparison section 170 and the control signal from threshold decision section 164 are received. The explanation here assumes that correlation value comparison section 170 compares the amplitude of the output signal of correlator 154 with that of the output signal of correlator 162 and carries out equivalent processing, but correlation value comparison section 170 can also compare the length of the output signal of correlator 154 with that of the output signal of correlator 162. When multipath signals are included in the first pulse detection window, the output signal of correlator 154 naturally becomes longer than the output signal of correlator 162. Furthermore, since it is the condition for completion of synchronization processing that the lengths of both output signals be identical, the length of the output signal can be used as a comparison reference.

When correlation value comparison section 170 decides that synchronization processing is not complete, synchronization processing is retried. In particular, when the result of integration (correlation value) of the correlations of the correlator 154 of DLL module 150 is greater than the result of integration of the correlations of correlator 162 of DLL module 160, it is possible to decide that multipath signals are detected by the first pulse detection window, which is longer in time than the second pulse detection window. For this reason, correlation value comparison section 170 outputs a control signal to narrow the first pulse detection window to wide pulse template generation section 153. Wide pulse template generation section 153 carries out processing of removing the influence of multipath signals while narrowing the first pulse detection window until correlation value comparison section 170 decides that the synchronization is complete.

Furthermore, DLL module 150 and DLL module 160 cooperate to increase the speed of synchronization processing. More specifically, when variable delay section 165 of DLL module 160 changes the amount of delay, this amount of delay is fed back to variable delay section 152. Furthermore, variable delay section 165 calculates the amount of delay estimated from the changed amount of delay and this estimated amount of delay is also fed back to variable delay section 152.

Variable delay section 152 can fully utilize the information about the fine synchronization processing carried out in DLL module 160 by changing the amount of delay based on at least one of these amounts of delay. As a result, the coarse synchronization processing carried out in DLL module 150 can be made finer. Moreover, since DLL module 160 can perform finer synchronization processing using the result of finer synchronization processing by DLL module 150, it is possible to make faster the overall synchronization processing in synchronization establishment unit 120.

Figure 3:
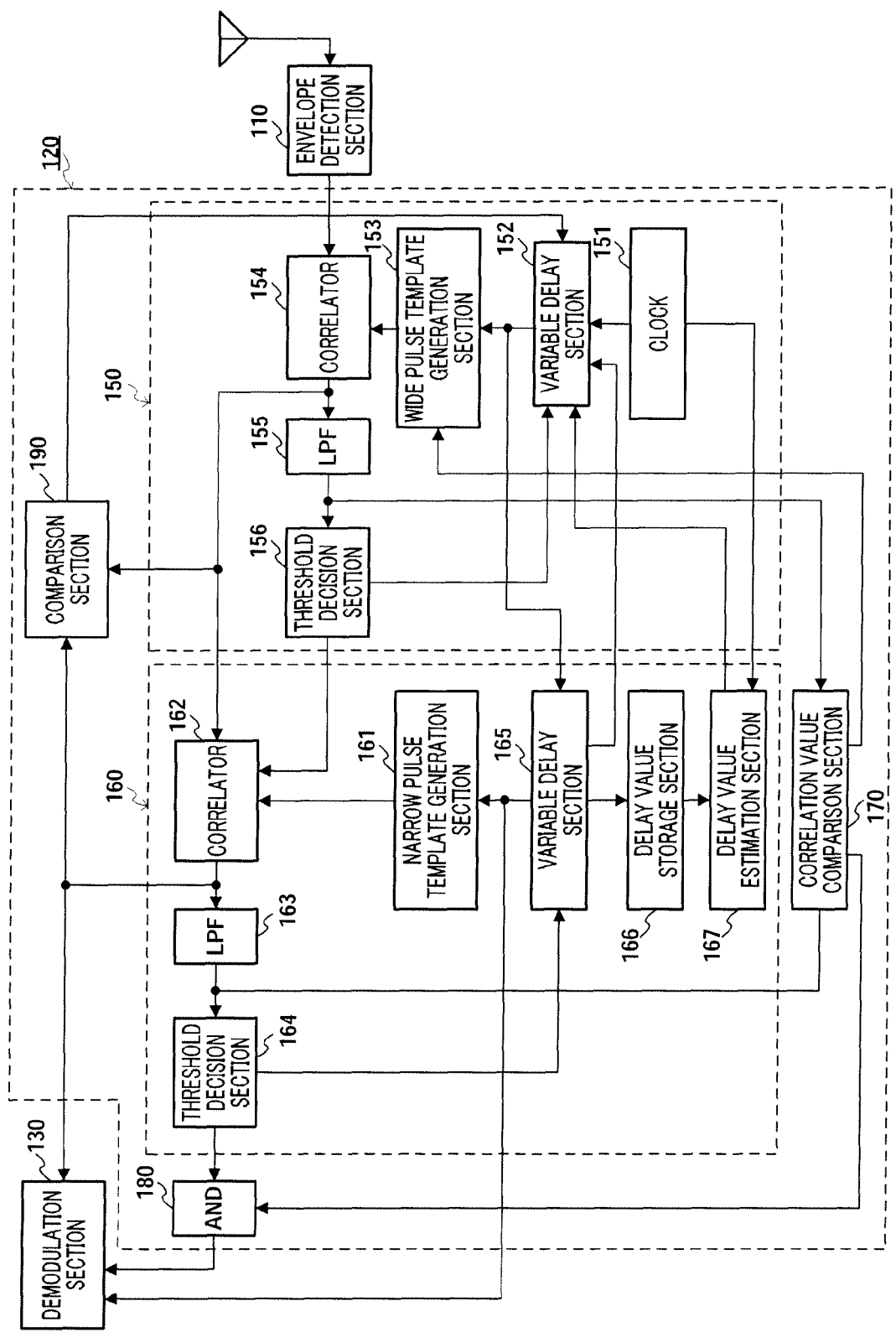
FIG. 3 is a block diagram showing another configuration of the synchronization establishment unit in FIG. 1.

The amount of delay change (hereinafter also referred to as "delay changing step") at variable delay section 152 of DLL module 150 may also be controlled based on the correlation result at correlator 154 and the correlation result at correlator 162. More specifically, as shown in FIG. 3, synchronization establishment unit 120 is provided with comparison section 190. This comparison section 190 detects the difference between the correlation result at correlator 154 and the correlation result at correlator 162. The delay changing step at variable delay section 152 is determined based on this difference and fed back to variable delay section 152.

Furthermore, the above explanation has described a case where the envelope result at envelope detection section 110 is inputted to synchronization establishment unit 120. However, the present invention is not limited to this and it is also possible to remove envelope detection section 110 from IR receiver 100 and directly input an incoming signal to synchronization establishment unit 120. In this case, synchronization establishment unit 120 performs synchronized detection (i.e. coherent detection).

EXAMPLES

Synchronization establishment unit 120 described above can be used as follows, for example.

In communication systems, communication information is transmitted either continuously or in bursts. In both cases, data transmitted from the transmitter is sub-divided into units known as "frames." The purpose of sub-dividing data into frames in continuous transmission is to provide a marker to track the received data at the end-user destination as well as to organize the data stream into bits of uniform size.

If phase shift keying (PSK) modulation is employed in communication, synchronization processing can be performed using synchronization establishment unit 120. That is, synchronization establishment unit 120 of Embodiment 1 can also be used to perform the synchronized detection for PSK symbols.

Figure 4:
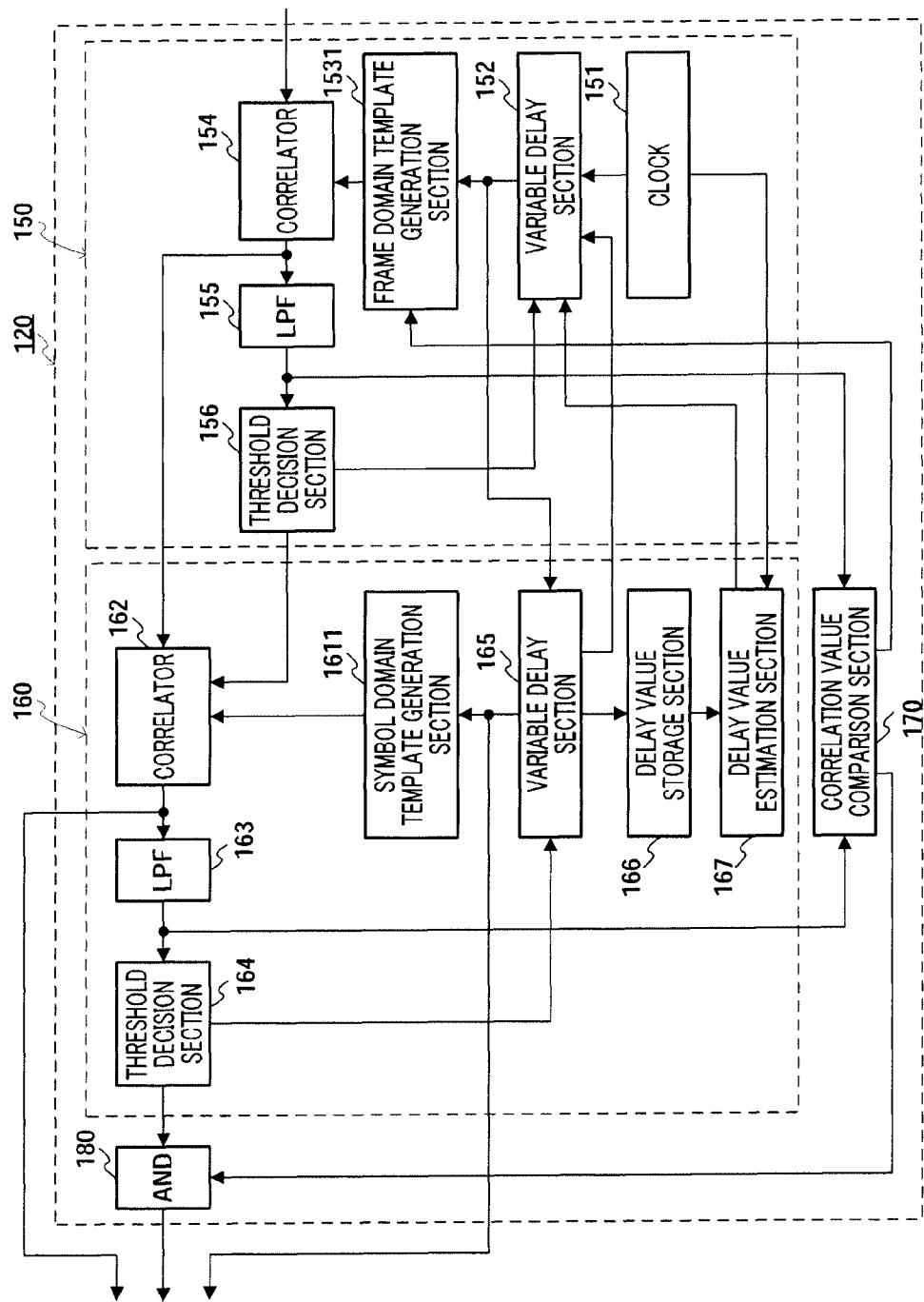
FIG. 4 illustrates an embodiment of the synchronization establishment unit.

As shown in FIG. 4, synchronization establishment unit 120 has frame domain template generation section 1531 and symbol domain template generation section 1611. Frame domain template generation section 1531 generates a frame domain template in the period corresponding to the frame length (first detection window) and outputs the frame domain template to correlator 154. Symbol domain template generation section 1611 generates a symbol domain template for a period shorter than the first detection window (second detection window), or, more specifically, generates symbol domain template for a period of several symbols, and outputs the symbol domain template to correlator 162.

DLL module 150 functions as a non-coherent detector and DLL module 160 functions as a coherent detector. That is, DLL module 150 is used in envelope detection and DLL module 160 is used in phase detection.

If the receiver cannot track and remove the adverse condition fast enough, frames may be lost due to poor communication quality. Frame synchronization is very important when communication information is transmitted continuously. This frame synchronization carried out to estimate the location where the data starts, and to utilize upon estimating unknown parameters for the receiver detection. In the symbol level acquisition mode, synchronization establishment unit 120 determines the presence of an incoming signal after frame synchronization. That is, DLL module 150 that establishes coarse synchronization and DLL module 160 that establishes fine are utilized to achieve both frame synchronization and symbol synchronization. Especially, DLL module 150 that establishes coarse synchronization is utilized for frame detection and synchronization, while DLL module 160 that establishes fine synchronization is utilized for symbol detection and synchronization.

As shown above, according to Embodiment 1, IR receiver 100 is provided with, synchronization establishment unit 120 having: correlator 154 as a first correlation means that determines the correlation between an incoming pulse signal and a first pulse template having a longer pulse width than the incoming pulse signal; threshold decision section 156, variable delay section 152 and wide pulse template generation section 153 as a first synchronization control means that decides whether or not first synchronization (i.e. coarse synchronization) has been established in accordance with the level of the correlation result from correlator 154 and shifts, upon deciding that the first synchronization (the coarse synchronization) has not been established, the timing for determining the correlation between the incoming pulse signal and the first pulse template; correlator 162 that determines the correlation between the correlation result from the first correlation means after the first synchronization (i.e. coarse synchronization) is established and a second pulse template having a pulse width at the same level as the incoming pulse signal (from several tens of picoseconds to several hundreds of picoseconds), which is shorter than the first pulse template; and threshold decision section 164, variable delay section 165, and narrow pulse template generation section 161, as a second synchronization control means that decides whether or not second synchronization (i.e. fine synchronization) has been established in accordance with the level of the correlation result from correlator 162, shifts the timing for determine the correlation between the correlation result from correlator 154 and the second pulse template upon deciding that the second synchronization has not been established and outputs timing information indicating that the second synchronization has been established upon deciding that the second synchronization (the fine synchronization) has been established, and demodulation section 130 that demodulates the incoming pulse signal in accordance with the timing information.

This allows synchronization to be established in two steps of coarse synchronization processing and fine synchronization processing and thereby allows fast and highly reliable synchronization to be established. As a result, the time and power required to establish synchronization can be reduced.

Furthermore, allowable communication quality can be reached quickly, and as a result, average throughput in the system can be improved.

Synchronization establishment unit 120 is provided with correlation value comparison section 170 that compares the correlation result from correlator 154 and correlation result from correlator 162, and threshold decision section 164 as the second synchronization control means, variable delay section 165, AND circuit 180 and narrow pulse template generation section 161 output the timing information when it is decided as a result of the comparison that both correlation results are identical and that the second synchronization has been established.

By so doing, it is decided whether or not synchronization has been established not only by the respective levels of both correlation results but also according to whether or not both correlation results are identical, and therefore finer synchronization can be established.

When the correlation result from correlator 154 is greater than the correlation result from correlator 162, the correlation value comparison section 170 performs control so as to reduce the length of the first pulse template.

By so doing, when the correlation result using the first pulse template having a greater time length is greater than the correlation result using the second pulse template having a smaller time length, there can be influence of multipath delay waves. In such a case, correlation value comparison section 170 can perform control so as to reduce the length of the first pulse template, thereby removing the influence of multipath delay waves and establishing more accurate synchronization.

When timing of correlation by correlator 154 is shifted, the first synchronization control means (threshold decision section 156, variable delay section 152 and wide pulse template generation section 153) outputs timing information to second synchronization control means (threshold decision section 164, variable delay section 165 and narrow pulse template generation section 161).

By so doing, timing information of when coarse synchronization is established can be used for fine synchronization processing, and therefore faster synchronization can be established.

When timing of correlation by correlator 162 is shifted, the second synchronization control means (threshold decision section 164, variable delay section 165 and narrow pulse template generation section 161) outputs the timing information to the first synchronization control means (threshold decision section 156, variable delay section 152 and wide pulse template generation section 153).

This allows timing information in fine synchronization processing to be fed back to coarse synchronization processing, so that the cooperation between both processings allows faster establishment of synchronization.

Embodiment 2

Embodiment 1 connects two DLL modules in series and carries out fast and accurate synchronization processing. On the other hand, Embodiment 2 connects two DLL modules (a DLL module for carrying out coarse synchronization processing and a DLL module for carrying out fine synchronization processing) in parallel and performs fast and accurate synchronization processing.

Figure 5:
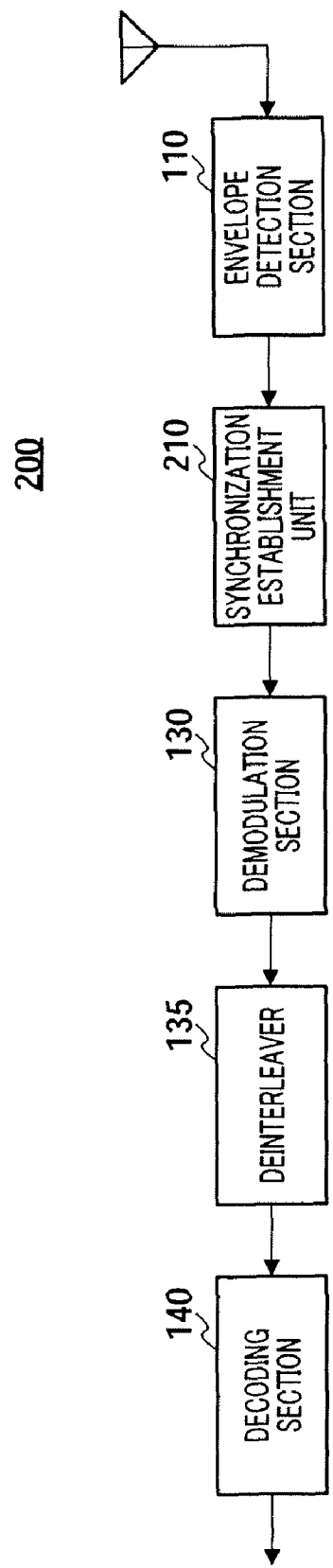
FIG. 5 is a block diagram showing a main configuration of an impulse radio (IR) receiver according to Embodiment 2.
Figure 6:
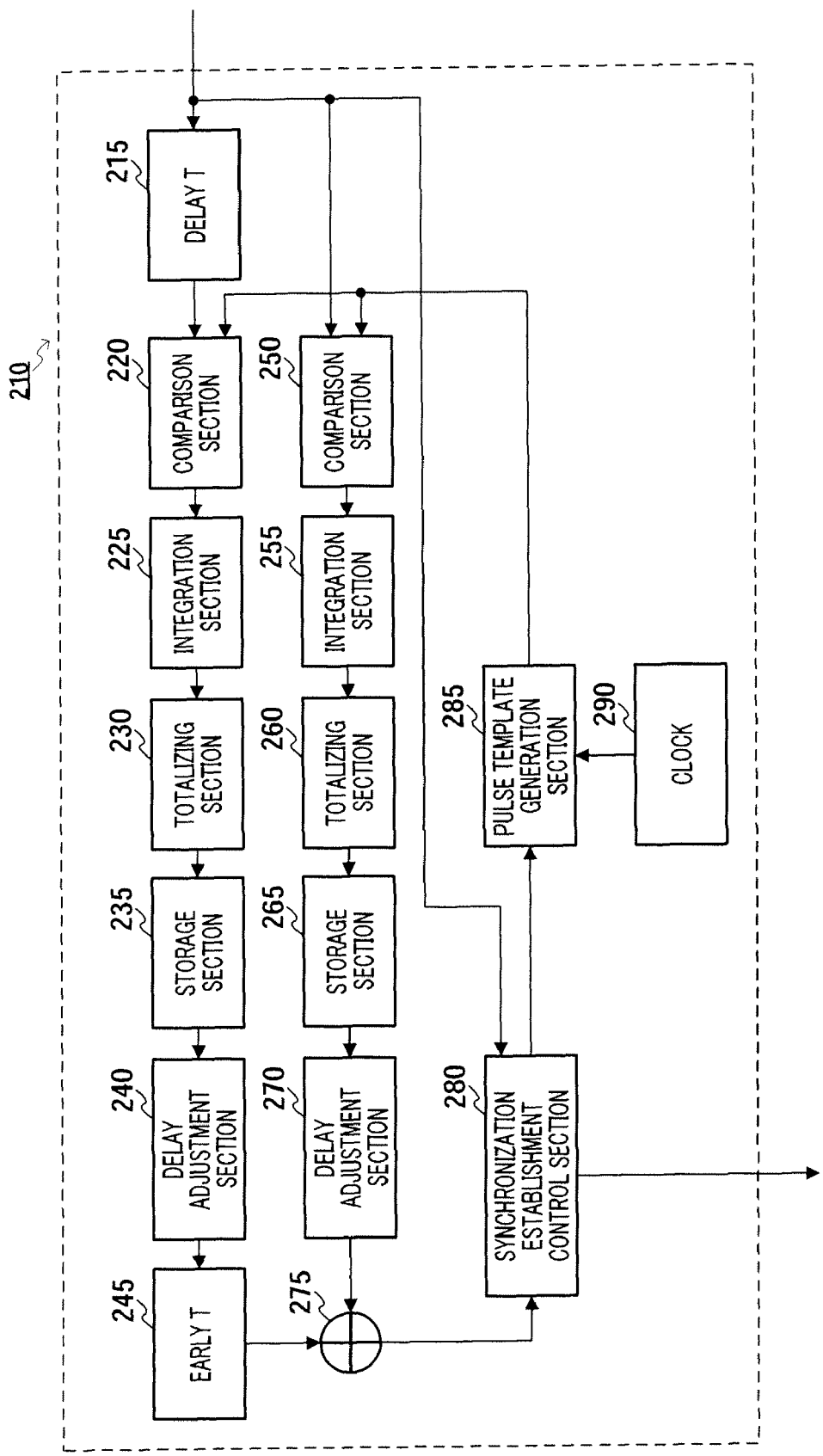
FIG. 6 is a block diagram showing a configuration of the synchronization establishment unit in FIG. 5.

As shown in FIG. 5, IR receiver 200 of Embodiment 2 has synchronization establishment unit 210. As shown in FIG. 6, this synchronization establishment unit 210 has delay T section 215, comparison section 220, integration section 225, totalizing section 230, storage section 235, delay adjustment section 240, early T section 245, comparison section 250, integration section 255, totalizing section 260, storage section 265, delay adjustment section 270, adder 275, synchronization establishment control section 280, pulse template generation section 285 and clock 290.

Comparison section 220 and comparison section 250 of synchronization establishment unit 210 receive envelope results. Here, delay T section 215 gives a delay of time T to the envelope result inputted to comparison section 220. This causes the envelope result inputted to comparison section 220 to become a later time period than the envelope result inputted to comparison section 250.

Furthermore, a pulse template generated at pulse template generation section 285 is inputted to comparison section 220 and comparison section 250. Both comparison section 220 and comparison section 250 find the difference between the envelope result and pulse template. However, since the envelope result delayed by T is inputted to comparison section 220, comparison section 220 and comparison section 250 find the differences between the envelope result and pulse template in different time periods.

Moreover, comparison section 220 finds the difference between the envelope result and pulse template only in the period corresponding to the first pulse detection window. On the other hand, comparison section 250 finds the difference between the envelope result and pulse template in the period corresponding to the second pulse detection window, which is shorter in time than the first pulse detection window.

Figure 7:
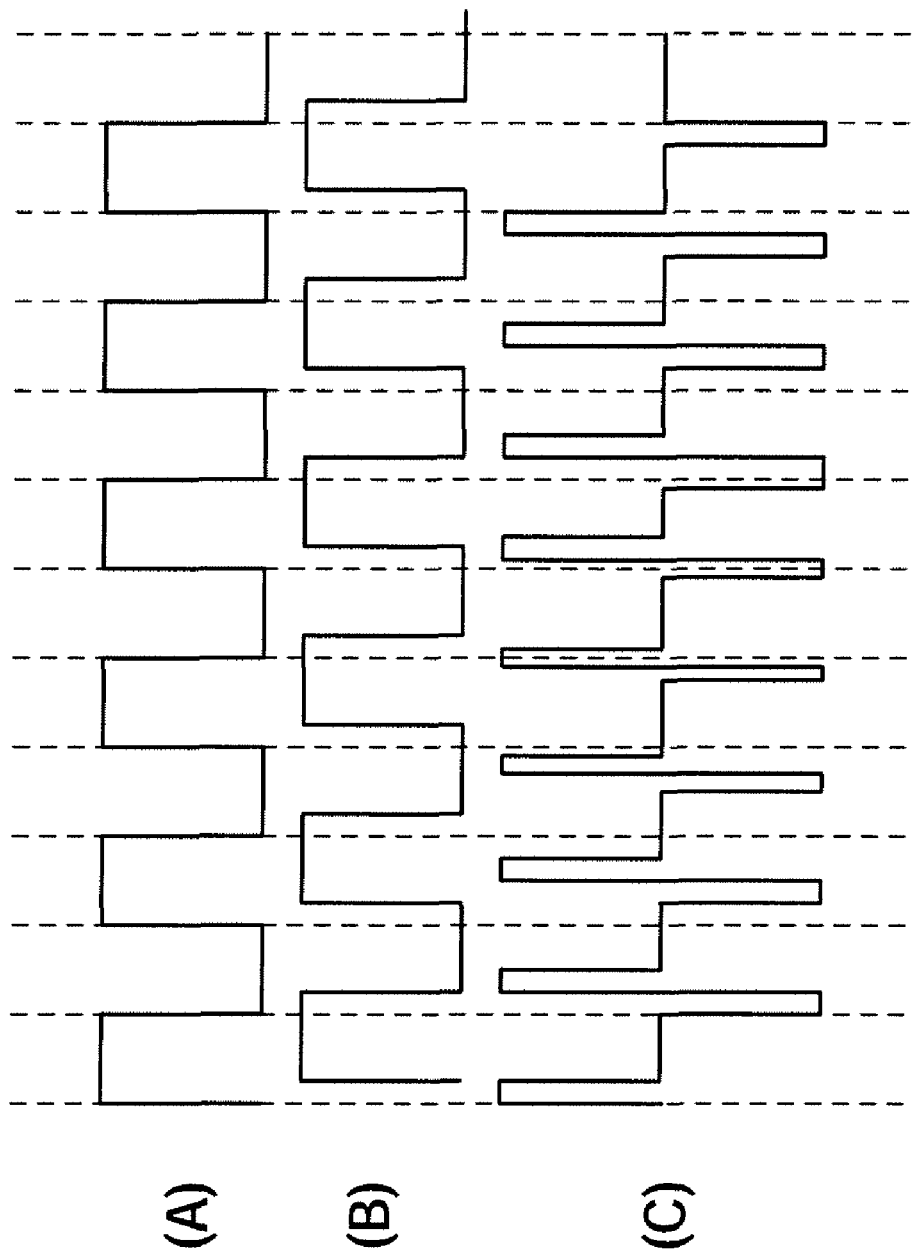
FIG. 7 illustrates the processing by the comparison section in FIG. 6.

More specifically, for example, assuming that the pulse signal shown in (A) of FIG. 7 is inputted to comparison section 220 and the pulse template from pulse template generation section 285 is the pulse signal shown in (B) of FIG. 7, the output signal from comparison section 220 which is the difference between the pulse signal in FIG. 7(A) and the pulse signal in FIG. 7(B) is like the pulse signal shown in (C) of FIG. 7.

Integration section 225 integrates the output signal from comparison section 220 for a predetermined period (e.g., frame period, first pulse detection window, etc.) and outputs the integration result to totalizing section 230.

Totalizing section 230 outputs a total value of output signals received so far from comparison section 220 every time an output signal from comparison section 220 is inputted. That is, when the sum of the first output signal and a second output signal outputted from comparison section 220 is outputted, and then a third output signal is outputted from comparison section 220, the sum of the first to third output signals is outputted. This processing is performed sequentially until all integration results of one packet data transmitted from the transmitter are inputted.

Storage section 235 receives and stores the total values corresponding to all the integration results of the one packet data from totalizing section 230 and outputs a maximum total value of these total values to delay adjustment section 240.

Delay adjustment section 240 receives as input the maximum total value from storage section 235 and calculate first amount of delay $\tau_1$ from this maximum total value using a predetermined relationship. An example of the predetermined relationship can be a relationship that the maximum total value and amount of delay $\tau_1$ have a linear relationship.

Since a delay of T has been given in delay T 215 in the route including comparison section 220 at the beginning, early T 245 subtracts T from the calculated amount of delay $\tau_1$ and outputs result $\tau_1'$ to adder 275.

Integration section 255 integrates the output signal from comparison section 250 for a predetermined period (e.g., frame period, second pulse detection window, etc.) and outputs the integration result to totalizing section 260.

Totalizing section 260 outputs a total value of output signals received so far from comparison section 250 every time an output signal from comparison section 250 is received as input. This processing is performed sequentially until all integration results of one packet data transmitted from the transmitter are inputted.

Storage section 265 receives as input and stores the total values corresponding to all the integration results of the one packet data from totalizing section 260 and outputs a maximum total value of these total values to delay adjustment section 270.

Delay adjustment section 270 receives as input the maximum total value from storage section 265, calculate second amount of delay $\tau_2$ from this maximum total value using a predetermined relationship and outputs the second amount of delay to adder 275. An example of the predetermined relationship can be a linear relationship between the maximum total value and amount of delay $\tau_2$.

Adder 275 gives amount of delay $\tau_1'$ and amount of delay $\tau_2$ and finds an average, and outputs average amount of delay $\tau$ to synchronization establishment control section 280.

Synchronization establishment control section 280 stores average amounts of delay $\tau$ and cumulatively adds up average amounts of delay $\tau$. Furthermore, synchronization establishment control section 280 compares average amount of delay $\tau$ inputted with a first threshold.

When average amount of delay $\tau$ is greater than establishment control section 280 decides that the synchronization processing in synchronization establishment unit 210 is not complete yet, and outputs the cumulative sum of average amount of delay $\tau$ to pulse template generation section 285.

On the other hand, when the average amount of delay is equal to or less than the first threshold, synchronization establishment control section 280 decides that synchronization processing in synchronization establishment unit 210 is complete and outputs the cumulative sum of average amounts of delay $\tau$ and the input signal to synchronization establishment unit 210 to demodulation section 130.

Pulse template generation section 285 outputs a pulse template at the timing delayed by the cumulative sum of average amounts of delay $\tau$ last received from synchronization establishment control section 280 from the timing the clock signal of clock 290 is received.

Figure 8:
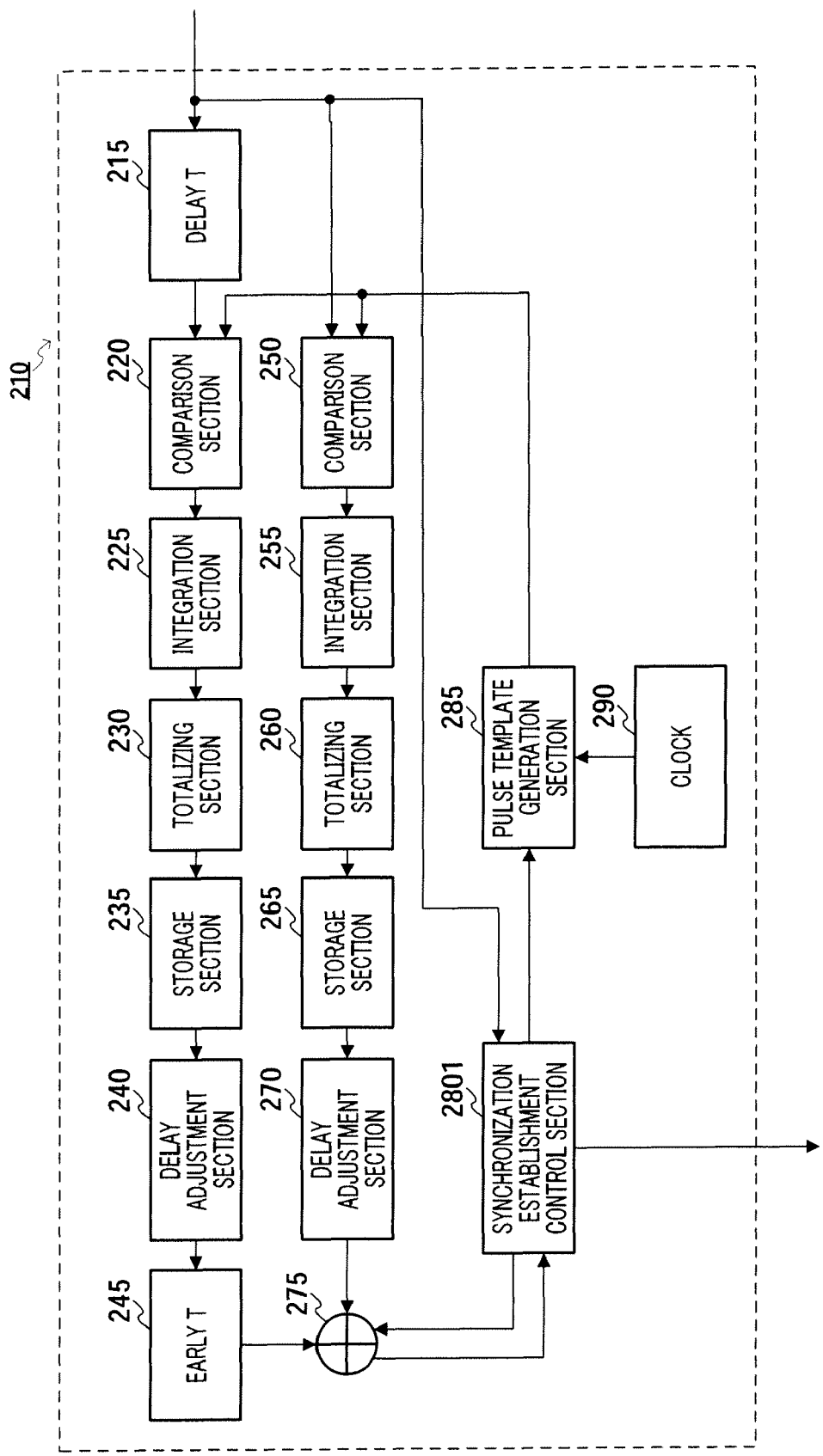
FIG. 8 is a block diagram showing another configuration of the synchronization establishment unit in FIG. 5.

According to the above explanation, adder 275 performs simple average processing, but adder 275 may also perform weighting and then averaging. In this case, synchronization establishment unit 210 has synchronization establishment control section 2801 as shown in FIG. 8. This synchronization establishment control section 2801 compares average amount of delay $\tau$ T from adder 275 with a second threshold greater than the first threshold.

When average amount of delay $\tau$ is greater than the second threshold, synchronization establishment control section 2801 decides that there is a considerable deviation from synchronization timing and outputs a large weight by which amount of delay $\tau_1'$ in the route (route including comparison section 220) in which coarse synchronization processing is carried out is multiplied and a small weight by which amount of delay $\tau_2$ in the route in which fine synchronization processing is carried out is multiplied to adder 275. In this way, processing is performed with emphasis placed on coarse synchronization processing.

On the other hand, when average amount of delay $\tau$ is equal to or less than the second threshold and average amount of delay $\tau$ is greater than the first threshold, synchronization establishment control section 2801 decides that though synchronization processing is not complete yet but the deviation from synchronization timing is small and outputs a small weight by which amount of delay $\tau_1'$ in the route (route including comparison section 220) in which coarse synchronization processing is performed is multiplied and a large weight by which amount of delay $\tau_2$ in the route in which fine synchronization processing is performed is multiplied to adder 275. In this way, processing is performed with emphasis placed on fine synchronization processing. When average amount of delay $\tau$ is equal to or less than the first threshold, synchronization establishment control section 2801 decides that synchronization is complete as in the case of synchronization establishment control section 280 and outputs the cumulative sum of average amounts of delay $\tau$ and the input signal to synchronization establishment unit 210 to demodulation section 130.

The above explanation has described the case where synchronization establishment unit 210 is provided with two routes, but the present invention is not limited to this and more routes may also be provided. In such a case, the sizes of the pulse detection windows used in the comparison sections provided in the respective routes differ from each other. Furthermore, the amounts of delay given in respective delays T provided before the comparison sections also differ from each other.

Figure 9:
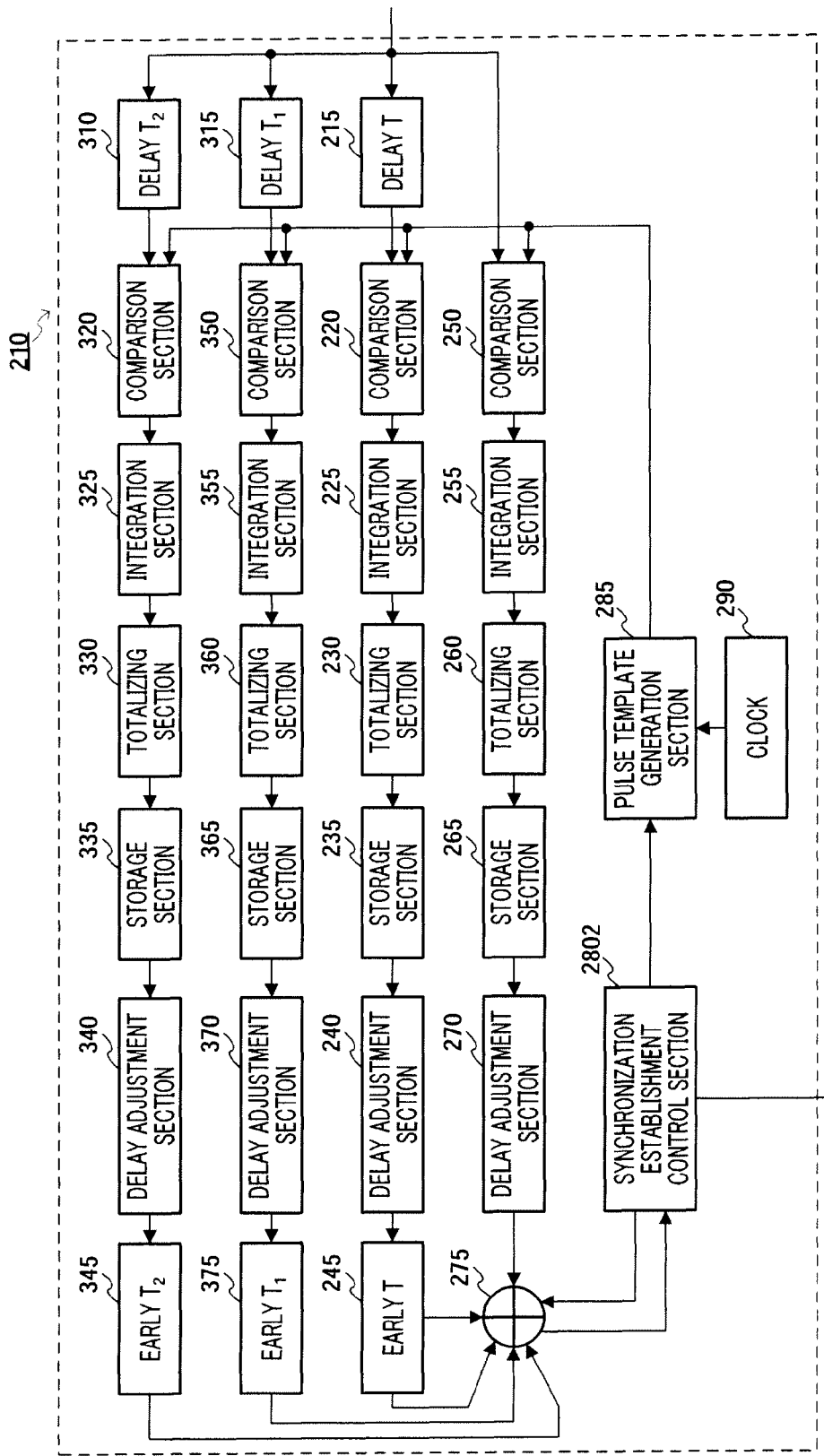
FIG. 9 is a block diagram showing another configuration of the synchronization establishment unit in FIG. 5.

As an example, FIG. 9 shows a configuration of synchronization establishment unit 210 in a case where the route is divided into four routes. As shown in the same figure, synchronization establishment unit 210 in the case of four routes has delay $T_2$ section 310, delay $T_1$ section 315, comparison section 320, integration section 325, totalizing section 330, storage section 335, delay adjustment section 340, early $T_2$ section 345, comparison section 350, integration section 355, totalizing section 360, storage section 365, delay adjustment section 370, early $T_1$ section 375 and synchronization establishment control section 2802.

Amounts of delay T, $T_1$ and $T_2$ given in delay T section 215, delay $T_1$ section 315 and delay $T_2$ section 310 respectively are different from each other. Times advanced by early T section 245, early $T_1$ section 375 and early $T_2$ section 345 correspond to amounts of delay T, $T_1$ and $T_2$ respectively. Furthermore, a third pulse detection window used at comparison section 320 and a fourth pulse detection window used at comparison section 350 are different in size from the first and second pulse detection windows. The fourth pulse detection window is larger than the first pulse detection window and the third pulse detection window is further larger than the fourth pulse detection window.

Synchronization establishment control section 2802 has a third threshold and a fourth threshold in addition to the first threshold and the second threshold. When average amount of delay $\tau$ (this corresponds to an average of the amounts of delay calculated from the four routes here) is larger than the largest fourth threshold, the timing is decided to be most distant from synchronization timing and the largest weight by which the amount of delay from delay adjustment section 340 that carries out the most coarse synchronization processing is multiplied is outputted to adder 275. In this case, weights by which the respective amounts of delay are multiplied are outputted in descending order of the amount of delay from delay adjustment section 370, amount of delay $\tau_1'$ from delay adjustment section 240 and amount of delay $\tau_2$ from delay adjustment section 270.

Furthermore, when average amount of delay $\tau$ is equal to or less than the fourth threshold and larger than the third threshold, weights by which the respective amounts of delay are multiplied are outputted in descending order of the amount of delay from delay adjustment section 370, amount of delay $\tau_1'$ from delay adjustment section 240, amount of delay $\tau_2$ from delay adjustment section 270 and amount of delay from delay adjustment section 340.

The above explanation has described the case where a delay section and an early section are provided in a certain route, but the present invention is not limited to this and those functional parts need not be provided. However, by providing those functional parts and changing the amount of delay to be added in each route and the amount of time to be advanced accordingly, it is possible to reduce the probability of producing a situation in which it is not possible to catch a pulse-like signal sequence for establishing synchronization in all the routes and thereby establish synchronization faster.

In this way, according to Embodiment 2, IR receiver 200 is has, synchronization establishment unit 210 including: comparison section 220 as a first subtraction means that calculates a difference between an incoming pulse signal and a first pulse template having a greater pulse width than the incoming pulse signal; integration section 225, totalizing section 230 and storage section 235 and delay adjustment section 240 as a first amount of delay calculation means that calculates an amount of delay using the difference signal obtained by the first subtraction means; comparison section 250 as a second subtraction means that has the incoming pulse signal and pulse width at the same level as the incoming pulse signal (from several tens of picoseconds to several hundreds of picoseconds) and calculates a difference from a second pulse template shorter than the first pulse template; integration section 255, totalizing section 260, storage section 265 and delay adjustment section 270 as a second amount of delay calculation means that calculates an amount of delay using the difference signal obtained at the second subtraction means; adder 275 that adds up the first amount of delay calculated by the first amount of delay calculation section and the second amount of delay calculated by the second amount of delay calculation means; and synchronization establishment control section 280 and pulse template generation section 285 as a synchronization establishment control means that decides whether or not synchronization has been established according to the level of the addition value obtained by adder 275, shifts, upon deciding that the synchronization has not been established, the timing of calculating a difference between the incoming pulse signal and the first pulse template and the timing of calculating a difference between the incoming pulse signal and the second pulse template and outputs, upon deciding that the synchronization has been established, timing information indicating that the synchronization has been established, and demodulation section 130 that demodulates the incoming pulse signal according to the timing information.

By so doing, the present embodiment establishes synchronization while shifting the timing of subtracting an incoming pulse signal and each pulse template based on the given amount of delay resulting from adding up the coarsely calculated amount of delay and finely calculated amount of delay, and can thereby fast establish synchronization through the cooperation between coarse synchronization processing and fine synchronization processing.

The synchronization establishment control means (synchronization establishment control section 2801 and pulse template generation section 285) decides whether or not synchronization has been established based on the result of a comparison between the addition value and first threshold and changes weights by which the first amount of delay calculated by the first amount of delay calculation section and the second amount of delay calculated by the second amount of delay calculation means according to the result of a comparison between the second threshold which is greater than the first threshold and the addition value. Furthermore, adder 275 adds up the first amount of delay calculated by the first amount of delay calculation means and the second amount of delay calculated by the second amount of de lay calculation means with respective weights assigned thereto.

By so doing, the weights by which the first and second amounts of delay are multiplied can be changed according to the result of the comparison between the addition value and the second threshold. Thus, when, for example, the addition value is greater than the second threshold, it is possible to decide that there is a considerable deviation from synchronization establishment. Thus, by setting a greater weight by which the first amount of delay which is the amount of delay in the route corresponding to coarse synchronization processing is multiplied than the weight by which the second amount of delay is multiplied, it is possible to place emphasis on the speed with priority given to coarse synchronization processing. On the other hand, when the addition value is equal to or less than the second threshold and greater than the first threshold, it is possible, by contraries, to give priority to fine synchronization processing giving priority to accuracy by setting a greater weight by which the second amount of delay is multiplied. This allows synchronization to be established fast and accurately.

Embodiment 3

The above embodiments have described the synchronization establishment method for an ASK modulated signal whereby an incoming signal is subjected to an envelope detection and a pulse position is acquired using the envelope result. On the other hand, the present embodiment will describe a case where the phase of a pulse is also synchronized. That is, the present embodiment primarily relates to synchronization processing when receiving a PSK modulated signal having a short time width of a signal representing one symbol. The PSK modulated signal having a short time width of a signal representing one symbol can be treated as equivalent to a pulse in many processes, and therefore may be called a "pulse" in the present embodiment.

Figure 10:
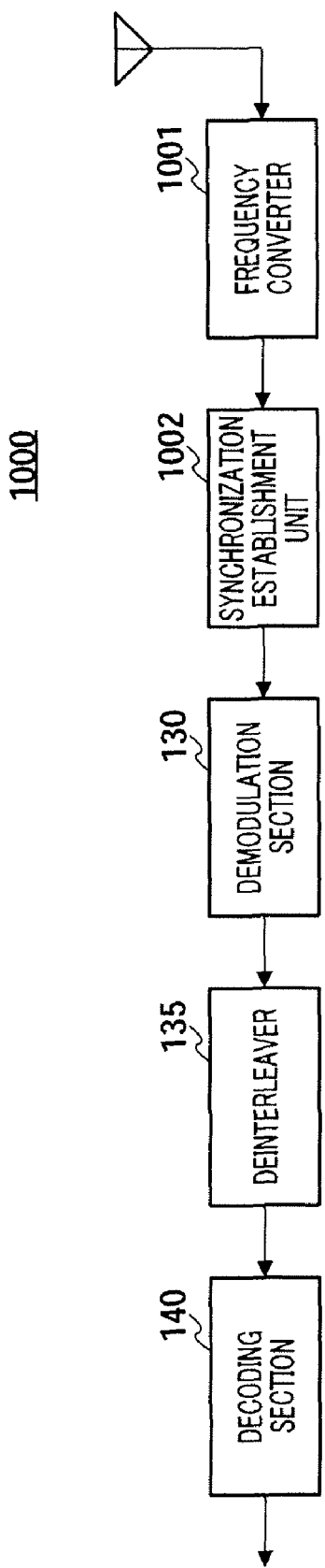
FIG. 10 is a block diagram showing a main configuration of a radio receiver according to Embodiment 3.

When synchronizing pulse phases, the radio receiver has a rough block configuration as shown in FIG. 10. As shown in FIG. 10, what radio receiver 1000 is significantly different from the configuration of impulse radio (IR) receiver 100 shown in FIG. 1 is the absence of envelope detection section 110 immediately after the antenna. Here, the present embodiment adopts a configuration in which frequency converter 1001 performs frequency domain conversion. However, frequency converter 1001 does not constitute an essential configuration. However, the accuracy of phase synchronization in synchronization establishment unit 1002 relates to the period of a carrier frequency of an incoming signal and the lower the carrier frequency, lower accuracy is required for synchronization. Therefore, the present embodiment adopts a configuration in which synchronization is established after shifting the carrier frequency to a low frequency side by frequency converter 1001. On the other hand, deinterleaver 135 and decoding section 140 have the same functions as those described above, and therefore explanations thereof will be omitted here.

Figure 11:
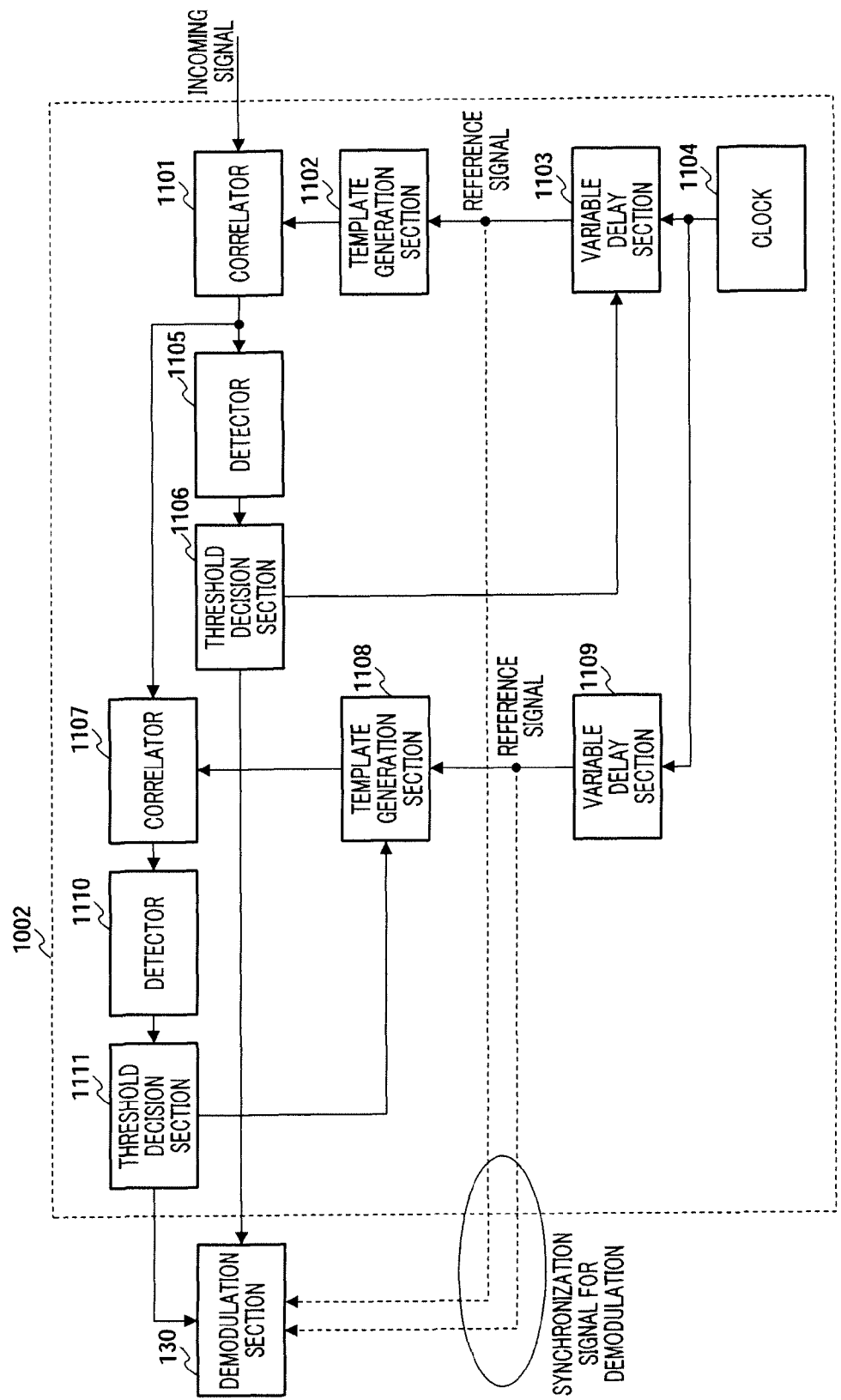
FIG. 11 is a block diagram mainly showing a configuration of the synchronization establishment unit in FIG. 10.

First, the functions of synchronization establishment unit 1002 and demodulation section 130 will be explained using FIGS. 11 to 13. FIG. 11 shows functional blocks of synchronization establishment unit 1002. The basic configuration is the same as that in FIG. 2.

An incoming signal (subjected to frequency domain conversion by frequency converter 1001) is inputted to correlator 1101.

Correlator 1101 calculates the correlation between a template generated by template generation section 1102 and an incoming signal based on the period of the clock signal generated by clock 1104. More specifically, template generation section 1102 outputs the template at the timing based on a reference signal obtained by variable delay section 1103 giving a predetermined amount of delay to the clock signal.

Detector 1105 outputs the signal obtained by removing the sine wave component from the correlation result of correlator 1101 to threshold decision section 1106.

Threshold decision section 1106 makes a 0 or 1 decision on the input signal and also detects the synchronization shift. When detecting the synchronization shift, threshold decision section 1106 performs control of changing the amount of delay of variable delay section 1103, that is, control as a DLL. Furthermore, threshold decision section 1106 outputs the 0 or 1 decision result to demodulation section 130.

Correlator 1107 receives as input the correlation result of correlator 1101 and calculates the correlation between the template generated by template generation section 1108 and the incoming signal. Template generation section 1108 outputs the template at the timing of a reference signal which is the output of variable delay section 1109. The amount of delay given to the clock signal by variable delay section 1109 is set according to the amount of delay set by variable delay section 1103.

Detector 1110 removes the sine wave component from the correlation result of correlator 1107, threshold decision section 1111 makes a 0 or 1 decision on the input signal based on the output signal of detector 1110 and also detects the synchronization shift. When detecting the synchronization shift, threshold decision section 1111 performs control of changing the amount of delay of variable delay section 1109, that is, control as a DLL. Furthermore, threshold decision section 1111 outputs the 0 or 1 decision result to demodulation section 130.

As described above, correlator 1101, template generation section 1102, variable delay section 1103, detector 1105 and threshold decision section 1106 constitute a first synchronization circuit, while correlator 1107, template generation section 1108, variable delay section 1109, detector 1110 and threshold decision section 1111 constitute a second synchronization circuit.

Here, as for the templates generated by template generation sections 1102 and 1108 of both synchronization circuits, by mutually changing their widths or designating the templates as a signal made up of only an envelope and a sine wave signal including phase information, it is possible to establish synchronization of different levels of accuracy in both synchronization circuits. Furthermore, by providing the first synchronization circuit and the second synchronization circuit that synchronize the respective templates with mutually different reference signals, it is possible to establish synchronization in a short time and accurately for signals of different levels of synchronization accuracy.

Next, synchronization in the case where a PSK modulated signal is received will be explained using FIGS. 12 and 13 as an example of different levels of synchronization accuracy.

FIG. 12 shows an example of signal waveform in synchronization of a PSK modulated signal using correlator 1101, that is, using the aforementioned first synchronization circuit.

With an arbitrary delay time given in variable delay section 1103, the clock signal generated by clock 1104 becomes a reference signal (output of variable delay section 1103) (see FIG. 12(A)). Based on this reference signal, that is, according to the timing of the reference signal, template generation section 1102 generates an envelope waveform imitating the band of an incoming signal (see FIG. 12(B)).

Here the width of the envelope waveform may be equal to, narrower than, or wider than the width of the incoming waveform. Here, when the widths are identical, if synchronization between signals is established, the entire energy of the incoming signal can be used for demodulation and efficient demodulation is possible. On the other hand, when the width of the envelope waveform is narrower, only the portion close to a peak of the waveform is used for demodulation, and the signal is thereby less affected by waveform distortion caused by the circuit or multipath signals. On the other hand, when the width of the envelope waveform is wider, a correlation can be detected even when the incoming waveform is slightly shifted from the template waveform, and therefore there is an advantage that synchronization is pulled in more quickly.

The calculation result of the correlation between the incoming waveform (FIG. 12(C)) and the envelope waveform becomes a waveform of the correlator output (FIG. 12(D)). Here, if synchronization has been established, many sine wave signals appear at the output, but if out of synchronization is detected, only some of the sine wave signals are outputted. The correlator output in FIG. 12(D) is smoothed by detector 1105 and outputted (FIG. 12(E)). Next, at the punching timing of a signal for demodulation (represented by a dotted line arrow in the longitudinal direction in the figure) formed using appropriate timing (trailing edge in FIG. 12) of the reference signal, threshold decision section 1106 decides the synchronization state of the detector output, or, more specifically, makes a 0 or 1 decision depending on whether or not the detector output exceeds a predetermined threshold (FIG. 12(F)). The synchronization decision result at this time is outputted to demodulation section 130 as a synchronization state signal. There are various proposals of the synchronization decision method, such the "Early-Late" method, which extracts the amplitude of a detector output signal at a plurality of punching timings and compares them, and any method can be used. The present embodiment describes an example where one punching timing is assumed and control is performed under a synchronization condition that this timing should exceed the threshold. Furthermore, a data sequence determined for synchronization pulling-in is generally used for establishment of synchronization and examples of the determined data sequence include a data sequence alternately repeating 0 and 1. In FIG. 12(F), as for the first and second pulses, the signal amplitude at the punching timing is equal to or less than a threshold, and therefore the amount of delay of variable delay section 1103 is controlled. As a result of such control, at the third pulse, the signal amplitude at the punching timing exceeds the threshold and first-step synchronization has been established.

FIG. 13 is an example of signal waveform in synchronization of a PSK modulated signal using correlator 1107, that is, using the aforementioned second synchronization circuit. The basic operation is similar to that in FIG. 12, but the difference is that the template generated by template generation section 1108 (see FIG. 13 (B)) includes the sine wave component. The approximate position of the received PSK modulated signal is defined in the aforementioned steps in FIG. 12, and therefore the second synchronization circuit sets the timing of a reference signal (FIG. 13 (A)) and an initial phase of the template in the second synchronization circuit based on the synchronization timing (reference signal) obtained in the first synchronization circuit and only phase synchronization of the sine wave may be established from the initial phase. More specifically, the clock signal given a predetermined amount of delay by variable delay section 1103 is the reference signal in the first synchronization circuit. Therefore, the second synchronization circuit sets an amount of delay in variable delay section 1109 based on the amount of delay in variable delay section 1103 when the first synchronization circuit has successfully established synchronization and also sets an initial phase of the template generated by template generation section 1108. In the first and second pulses (FIG. 13(C)), the output of the signal amplitude at the punching timing (correlator output (FIG. 13(D)) smoothed by detector 1110 (FIG. 13(E)) is equal to or less than a threshold. Therefore, as a result of controlling the amount of delay of variable delay section 1109, in the third pulse, the signal amplitude at the punching timing exceeds the threshold and second-step synchronization has been established (FIG. 13 (F)).

As shown above, also when receiving a PSK modulated signal, the first synchronization circuit uses a signal of only an envelope as a template, and can thereby establish synchronization in a short time (however, since phase synchronization has not been established yet, this is more or less coarse synchronization). Furthermore, the second synchronization circuit can establish synchronization in a short time and accurately by setting an initial phase based on the synchronization timing obtained in the first synchronization circuit, using a signal having a sine wave component as a template and carrying out phase synchronization from the initial phase. In other words, by establishing synchronization necessary to demodulate an ASK modulated signal and synchronization necessary to demodulate a PSK modulated signal in steps, it is possible to realize synchronization pulling-in in a short time also when synchronizing a PSK modulated signal. Furthermore, by establishing synchronization necessary to demodulate an ASK modulated signal and synchronization necessary to demodulate a PSK modulated signal in steps, power to the second synchronization circuit is turned off until synchronization necessary to demodulate the ASK modulated signal is established, the circuit is thereby not activated but only activated when synchronization necessary to demodulate the ASK modulated signal is established. On the other hand, it is possible to perform control such that the first synchronization circuit is activated only when synchronization necessary to demodulate the ASK modulated signal has not been established and not activated after synchronization necessary to demodulate the ASK modulated signal is established. That is, it is possible to perform such control that activates only one of the first synchronization circuit and the second synchronization circuit. In other words, it is possible to realize such control that selects both synchronization circuits according to the synchronization state. Such control can reduce power consumption.

Sharing of synchronization information between a plurality of synchronization blocks and the function for multipath signal detection described in FIG. 2 or the like can be mounted likewise, and therefore explanations thereof will be omitted.

Furthermore, the above explanation has described examples all using analog elements, but these examples are used to make easier explanations of the overall relationship of waveforms and it is likewise possible to use an analog-digital conversion circuit (ADC) or the like, perform quantization and then perform processing.

Furthermore, the above explanation has only described that synchronization is adjusted by a synchronization circuit for PSK synchronization (aforementioned second synchronization circuit) after establishing synchronization with a circuit for ASK synchronization (aforementioned first synchronization circuit). However, when synchronization cannot be established even after adjusting synchronization using the circuit for PSK synchronization for a predetermined time, synchronization may be adjusted using the circuit for PSK synchronization after adjusting synchronization using the circuit for ASK synchronization again. For example, variations in the signal arrival time due to a drastic positional variation and malfunction of synchronization timing adjustment caused by instantaneous interruption of a communication route or the like may lead to a considerable variation of synchronization timing.

According to the above explanation, the second synchronization circuit needs to perform the processing shown in FIG. 13 until phase synchronization is established to demodulate a PSK modulated signal. However, when a system that transmits an ASK modulated signal as well as a PSK modulated signal receives an ASK modulated signal, the system can perform demodulation only based on the synchronization timing obtained through the first-step synchronization establishment processing without performing the second-step synchronization establishment processing. This is because the ASK modulated signal can be modulated even through relatively coarse synchronization compared to the PSK modulated signal. In such a case, it is possible to perform such control that the second synchronization circuit is not activated by turning off the power. This allows power consumption to be reduced. Furthermore, faster synchronization processing is possible with an ASK modulated signal than with a PSK modulated signal. Whatever the case may be, demodulation section 130 demodulates an incoming signal based on a reference signal in each synchronization circuit after acquiring a synchronization state signal indicating a state that synchronization has been established from each synchronization circuit.

The above explanation has shown an example where an input signal of a circuit for PSK synchronization (aforementioned second synchronization circuit) is used as an output signal of a circuit for ASK synchronization (aforementioned first synchronization circuit). However, it is possible to adopt a configuration that prevents influence of distortion of the incoming waveform caused by the circuit for ASK synchronization by branching the signal at the output end of the receiving antenna or the output end of frequency converter 1001 and using each of the branched signals as an input signal of the circuit for ASK synchronization or the circuit for PSK synchronization, or it is possible to perform control so as to reduce power consumption by operating only one of the synchronization circuits.

For an environment using such a configuration that operates only one of the synchronization circuits, a system that performs communication using an ASK modulated signal during a waiting time and performs communication using a PSK modulated signal when exchanging data, is possible. Furthermore, for an operating environment, a system that the transmitter specifies the modulation scheme and the receiver described in the present embodiment judges the specification of the transmitting side and switches the synchronization section as appropriate.

Demodulation section 130 identifies the modulation scheme specified by the transmitter and details thereof are a combination of known techniques, and therefore explanations thereof will be omitted here.

Other Embodiments

Embodiment 1 has been explained assuming that DLL module 150 that performs coarse synchronization processing is always operating. However, the present invention is not limited to this and DLL module 150 and DLL module 160 that performs fine synchronization processing need not always be operating. For example, the IR receiver can also receive a signal having a wider pulse than an ordinary one and when that pulse width matches a wider pulse width in coarse synchronization DLL module 150, coarse synchronization DLL module 150 is enough to establish fine synchronization, and therefore IR receiver 100 can stop fine synchronization DLL module 160.

Furthermore, when the IR transmitter and IR receiver 100 are in a stationary state, the transmission channel characteristic changes moderately. Therefore, in such a case, coarse synchronization DLL module 150 need not perform adjustment for a long time. Therefore, after initial acquisition is completed, coarse synchronization DLL module 150 can be set in a non-operating state for a predetermined time. In such a case, only fine synchronization DLL module 160 can continue tracking. By setting the coarse synchronization DLL module in an operating state again after the predetermined time, it is possible to check any variation in the channel characteristic.

The disclosures of Japanese Patent Application No. 2006-023586, filed on Jan. 31, 2006, and Japanese Patent Application No. 2007-014314, filed on Jan. 24, 2007, including the specifications, drawings and abstracts are incorporated herein by reference in their entirety.

INDUSTRIAL APPLICABILITY

The radio receiving apparatus and radio receiving method according to the present invention are useful to realize establishment of fast and highly reliable synchronization.

The invention claimed is:

1. A radio receiving apparatus comprising:
a first synchronization circuit that synchronizes an incoming signal with a first reference signal;
a second synchronization circuit that synchronizes the incoming signal with a second reference signal based on the first reference signal when synchronization is established in the first synchronization circuit; and
a demodulation section that demodulates the incoming signal based on one of synchronization information output from the first synchronization circuit and synchronization information output from the second synchronization circuit, wherein:
the first synchronization circuit comprises a first correlation section that determines a correlation between the incoming signal and a first pulse template received as input at a timing corresponding to the first reference signal;
the second synchronization circuit comprises a second correlation section that determines a correlation between the incoming signal and a second pulse template received as input at a timing corresponding to the second reference signal; and
the first pulse template has a longer width than a width of the second pulse template,
wherein the first synchronization circuit further comprises:
a first pulse template generation section to generate the first pulse template,
a first variable delay section to output a first delay signal to the first pulse template generation section to change an amount of delay of the first pulse template, and
a first threshold decision section to output a control signal to one of the second synchronization circuit or the first variable delay section based on the determined correlation between the incoming signal and the first pulse template, and
wherein the second synchronization circuit further comprises:
a second pulse template generation section to generate the second pulse template,
a second variable delay section to output a second delay signal to the second pulse template generation section to change an amount of delay of the second pulse template, and
a second threshold decision section to output a control signal to one of the demodulation section or the second variable delay section based on the determined correlation between the incoming signal and the second pulse template.

2. The radio receiving apparatus according to claim 1, wherein the first synchronization circuit and the second synchronization circuit each output a synchronization state signal showing a synchronization state as the synchronization information.

3. The radio receiving apparatus according to claim 2, wherein the demodulation section demodulates the incoming signal based on the reference signal at the respective synchronization circuits after acquiring the synchronization state signal indicating a state in which synchronization has been established from the respective synchronization circuits.

4. The radio receiving apparatus according to claim 2, wherein the radio receiving apparatus selects a synchronization circuit to be operated according to the synchronization state.

5. The radio receiving apparatus according to claim 1, wherein the first synchronization circuit comprises:
a synchronization control section that decides whether or not synchronization has been established according to a level of a correlation result output from the first correlation section and shifts a correlation timing upon deciding that synchronization has not been established.

6. The radio receiving apparatus according to claim 5, wherein a signal having a longer signal time than the incoming signal is used as the first pulse template.

7. The radio receiving apparatus according to claim 5, wherein:
the synchronization control section outputs, when the correlation timing is shifted, timing information indicating timing to the second synchronization circuit, and
the second synchronization circuit adjusts the timing of the second reference signal based on the timing information.

8. The radio receiving apparatus according to claim 1, wherein the second synchronization circuit comprises:
a synchronization control section that decides whether or not synchronization has been established according to a level of a correlation result output from the second correlation section and shifts, upon deciding that synchronization has not been established, timing of correlation with the second pulse template.

9. The radio receiving apparatus according to claim 8, wherein in a signal having a signal time substantially identical to an incoming signal is used as the second pulse template.

10. The radio receiving apparatus according to claim 8, wherein an input signal of the second synchronization circuit is a result of correlation between the incoming signal in the first synchronization circuit and the first reference signal.

11. The radio receiving apparatus according to claim 1, further comprising:
  a comparison section that compares a correlation result obtained from the first correlation section with a correlation result obtained from the second correlation section.

12. The radio receiving apparatus according to claim 11, wherein the comparison section outputs, when both correlation results are decided to be identical, synchronization establishment completion information to the demodulation section.

13. The radio receiving apparatus according to claim 11, wherein the comparison section shortens the first pulse template when the correlation result obtained from the first correlation section is decided to be different from the correlation result obtained from the second correlation section.

14. The radio receiving apparatus according to claim 13, wherein the comparison section compares both correlation results using a signal length as a reference.

15. The radio receiving apparatus according to claim 13, wherein the comparison section compares both correlation results using a signal amplitude as a reference.

16. The radio receiving apparatus according to claim 8, wherein:
  the second synchronization control section outputs, when the timing of correlation is shifted, timing information indicating the timing to the first synchronization circuit, and
  the first synchronization circuit adjusts timing of the first reference signal based on the timing information.

17. The radio receiving apparatus according to claim 1, wherein the first synchronization circuit performs synchronization of the incoming signal which is input to the first synchronization circuit as an ASK signal and the second synchronization circuit performs synchronization of the incoming signal which is input to the second synchronization circuit as a PSK signal.

18. The radio receiving apparatus according to claim 17, wherein the first synchronization circuit establishes synchronization using an envelope result of the incoming signal.

19. The radio receiving apparatus according to claim 17, wherein the second synchronization circuit performs phase synchronization of the incoming signal.

20. The radio receiving apparatus according to claim 19, wherein the second synchronization circuit sets an initial phase based on the synchronization information output from the first synchronization circuit when carrying out the phase synchronization.

21. The radio receiving apparatus according to claim 1, wherein both synchronization circuits are switched according to a modulation scheme of the incoming signal.

22. A radio receiving method comprising:
  synchronizing an incoming signal with a first reference signal;
  synchronizing the incoming signal with a second reference signal based on the first reference signal when synchronization has been established in the synchronizing of the incoming signal with the first reference signal;
  demodulating the incoming signal based on at least one of synchronization information output from the synchronizing of the incoming signal with the first reference signal and synchronization information output from the synchronizing of the incoming signal with the second reference signal;
  determining a correlation between the incoming signal and a first pulse template received as input at a timing corresponding to the first reference signal; and
  determining a correlation between the incoming signal and a second pulse template received as input at a timing corresponding to the second reference signal,
  wherein the first pulse template has a longer width than a width of the second pulse template,
  wherein the synchronizing of the incoming signal with the first reference signal comprises:
    generating the first pulse template,
    outputting a first delay signal to change an amount of delay of the first pulse template, and
    outputting a control signal to control one of the synchronizing of the incoming signal with the second reference signal or the outputting of the first delay signal based on the determined correlation between the incoming signal and the first pulse template, and
  wherein the synchronizing of the incoming signal with the second reference signal comprises:
    generating the second pulse template,
    outputting a second delay signal to change an amount of delay of the second pulse template, and
    outputting a control signal to control one of the demodulating of the incoming signal or the outputting of the second delay signal based on the determined correlation between the incoming signal and the second pulse template.

* * * * *